(12) United States Patent
Ilincic et al.

(10) Patent No.: US 11,030,339 B1
(45) Date of Patent: *Jun. 8, 2021

(54) SYSTEMS AND METHODS FOR DATA ACCESS CONTROL OF PERSONAL USER DATA USING A SHORT-RANGE TRANSCEIVER

(71) Applicant: Capital One Services, LLC, McLean, VA (US)

(72) Inventors: Rajko Ilincic, Annandale, VA (US); Jeffrey Rule, Chevy Chase, MD (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/863,750

(22) Filed: Apr. 30, 2020

(51) Int. Cl.
*G06F 21/62* (2013.01)
*H04L 9/32* (2006.01)
(Continued)

(52) U.S. Cl.
CPC ........ *G06F 21/6245* (2013.01); *G06F 21/602* (2013.01); *H04L 9/0819* (2013.01); *H04L 9/3213* (2013.01); *H04L 9/3234* (2013.01)

(58) Field of Classification Search
CPC .. G06Q 20/40; G06Q 20/352; G06Q 20/3278; G06F 16/00; G06F 21/00;
(Continued)

(56) References Cited

U.S. PATENT DOCUMENTS

| 4,683,553 A | 7/1987 | Mollier |
| 4,827,113 A | 5/1989 | Rikuna |

(Continued)

FOREIGN PATENT DOCUMENTS

| CA | 3010336 | 7/2017 |
| CN | 101192295 | 6/2008 |

(Continued)

OTHER PUBLICATIONS

Batina, Lejla and Poll, Erik, "SmartCards and RFID", Course PowerPoint Presentation for IPA Security Course, Digital Security at University of Nijmegen, Netherlands (date unknown) 75 pages.
(Continued)

*Primary Examiner* — Trang T Doan
(74) *Attorney, Agent, or Firm* — Hunton Andrews Kurth LLP

(57) ABSTRACT

Systems and methods for controlling data access through the interaction of a short-range transceiver, such as a contactless card, with a client device are presented. An exemplary system and method may include establishing a database storing identifiers and keys for users and service providers, receiving from a client device of the service provider, via a network, a service provider token and a request for a data access key, the request generated in response to a tap action between a contactless card associated with a user and the client device, verifying the service provider is authorized to receive access to personal user data encrypted and stored on the contactless card, generating a data access key based on a user key, and transmitting to the service provider client device, via the network, the data access key, such that the client device may decrypt the personal user data obtained from the contactless card.

19 Claims, 13 Drawing Sheets

System 100

(51) Int. Cl.
*H04L 9/08* (2006.01)
*G06F 21/60* (2013.01)

(58) Field of Classification Search
CPC ........ G06F 21/35; G06F 21/602; G06F 21/44;
G06F 21/6245; G06F 21/78; G07F
7/0893; H04L 67/16; H04L 67/2838;
H04L 67/32; H04L 9/3213; H04L 9/0819;
H04L 9/3234
See application file for complete search history.

(56) References Cited

U.S. PATENT DOCUMENTS

| | | |
|---|---|---|
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Mamdani et al. |
| 8,005,426 B2 | 8/2011 | Huomo et al. |
| 8,010,405 B1 | 8/2011 | Bortolin et al. |
| RE42,762 E | 9/2011 | Shin |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |

(56) References Cited

U.S. PATENT DOCUMENTS

| | | |
|---|---|---|
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Vernon et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijay Shankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Mathur et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 10,528,944 B2 * | 1/2020 | Khan .................. H04W 12/068 |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |

(56) References Cited

U.S. PATENT DOCUMENTS

| | | |
|---|---|---|
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185375 A1 | 7/2013 | Jaudon et al. |
| 2013/0191279 A1 | 7/2013 | Calman et al. |
| 2013/0200999 A1* | 8/2013 | Spodak ............... G16H 10/60 340/5.65 |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0320080 A1* | 12/2013 | Olson ............... G07F 7/0833 235/380 |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |

(56) References Cited

U.S. PATENT DOCUMENTS

| | | |
|---|---|---|
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1 | 10/2015 | Malek |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1* | 9/2016 | Lowe .................. G06F 21/35 |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0213218 A1* | 7/2017 | Pickering ............ G06Q 20/341 |
| 2017/0221047 A1* | 8/2017 | Veerasangappa Kadi .................. G06Q 20/352 |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1 | 8/2019 | D'Agostino et al. |
| 2019/0392416 A1* | 12/2019 | Bernholc ............ G06K 7/10316 |
| 2020/0184482 A1* | 6/2020 | Sharma .............. G06Q 20/3278 |

FOREIGN PATENT DOCUMENTS

| | | |
|---|---|---|
| CN | 103023643 | 4/2013 |
| CN | 103417202 | 12/2013 |
| EP | 1 085 424 | 3/2001 |
| EP | 1 223 565 | 7/2002 |
| EP | 1 265 186 | 12/2002 |
| EP | 1 783 919 | 5/2007 |
| EP | 2 852 070 | 1/2009 |
| EP | 2 139 196 | 12/2009 |
| EP | 1 469 419 | 2/2012 |
| GB | 2 457 221 | 8/2009 |
| GB | 2 516 861 | 2/2015 |
| GB | 2 551 907 | 1/2018 |
| KR | 101508320 | 4/2015 |
| WO | WO 00/49586 | 8/2000 |
| WO | WO 2006070189 | 7/2006 |
| WO | WO 2008055170 | 5/2008 |
| WO | WO 2009025605 | 2/2009 |
| WO | WO 2010049252 | 5/2010 |
| WO | WO 2011112158 | 9/2011 |
| WO | WO 2012001624 | 1/2012 |
| WO | WO 2013039395 | 3/2013 |
| WO | WO 2013155562 | 10/2013 |
| WO | WO 2013192358 | 12/2013 |
| WO | WO 2014043278 | 3/2014 |
| WO | WO 2014170741 | 10/2014 |
| WO | WO 2015179649 | 11/2015 |
| WO | WO 2015183818 | 12/2015 |
| WO | WO 2016097718 | 6/2016 |
| WO | WO 2016160816 | 10/2016 |
| WO | WO 2016168394 | 10/2016 |
| WO | WO 2017042375 | 3/2017 |
| WO | WO 2017042400 | 3/2017 |
| WO | WO 2017157859 | 9/2017 |
| WO | WO 2017208063 | 12/2017 |
| WO | WO 2018063809 | 4/2018 |
| WO | WO 2018137888 | 8/2018 |

OTHER PUBLICATIONS

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Pourghomi, Pardis et al., "A Proposed NFC Payment Application," International Journal of Advanced Computer Science and Applications, vol. 4, No. 8, 2013.

(56) References Cited

OTHER PUBLICATIONS

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.
Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.
Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.
Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.
Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
Author unknown, "NFC Guide: All You Need to Know About Near Field Communication" Square Guide [online] 2018[retrieved on Nov. 13, 2018]. Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K, "Goldbug Big Seven open source crypto-messengers to be compared—: or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song, F., and Yun, A.l, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.
Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone" Conference paper (2013) IEEE AFRICON at Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author unknown: "onetappayment™", [online] Jan. 24, 2019, [retrieved on Mar. 25, 2019]. Retrieved from Internet URL: https://www.payubiz.in/onetap, 4 pages.
Vu et al., (2012). "Distinguishing users with capacitive touch communication" Proceedings of the Annual International Conference on Mobile Computing and Networking, MOBICOM. 10.1145/2348543.2348569.
EMVCo, EMV Card Personalization Specification, version 1.0 (Jun. 2003), 81 pages.
Ullmann et al., (2012). "On-Card" User Authentication for Contactless Smart Cards based on Gesture Recognition, LNI, 223-234, 12 pages.

(56) References Cited

OTHER PUBLICATIONS

Faraj et al. (2008). "Investigation of Java Smart Card Technology for Multi-Task Applications" J. of Al-Anbar University for Pure Science, vol. 2: No. 1: 2008, 11 pages.

Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.

* cited by examiner

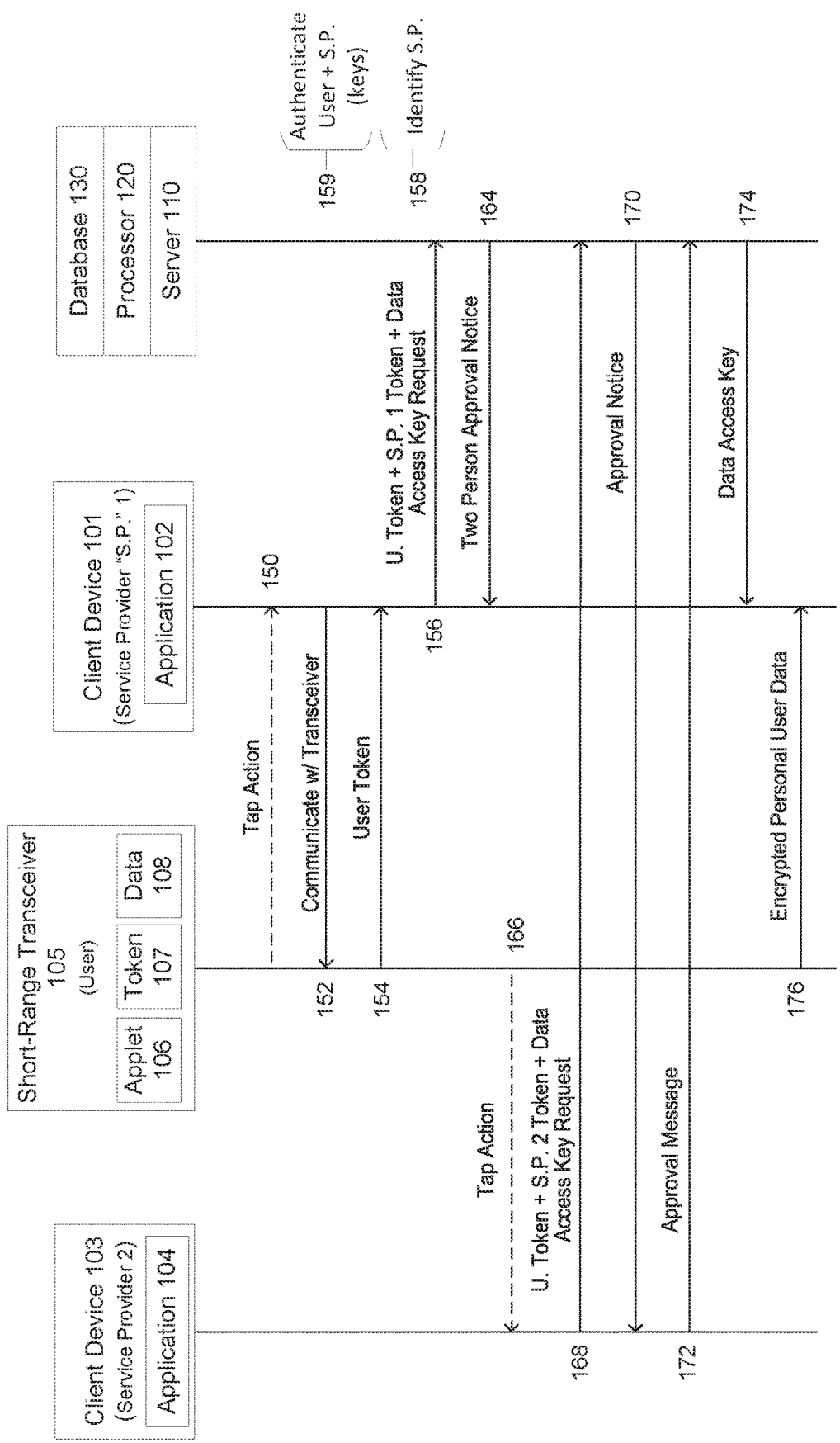

System 800

SYSTEMS AND METHODS FOR DATA ACCESS CONTROL OF PERSONAL USER DATA USING A SHORT-RANGE TRANSCEIVER

FIELD OF THE DISCLOSURE

The present disclosure relates generally to user data control and, more specifically, to exemplary systems and methods for active control of access to personal user data through the interaction of a short-range transceiver with a client device.

BACKGROUND

A typical user has personal user information or data that may be of a sensitive or confidential nature, including, for example, such information as personal health data, social security number, family contacts, etc. When a user creates an account, the user will generally provide a certain amount of personal, identifying information regarding the user, as well as information for account access such as a username and password. Entities other than the user may add to the personal user data. Different entities may have, for example, different user data retention policies, different use policies, and different user data sharing policies. The policies of using user-information may further change without any notification to the user. In addition, the possessor of the user information may also change through a merger or buy-out of one entity by another, many times without any notice to the user.

Account access will often rely on log-in credentials (e.g., username and password) to confirm a cardholder's identity. However, if the log-in credentials are compromised, another person could have access to the user's account and, potentially, to the user's sensitive or confidential information or data. In addition, the more entities or individuals that a user shares their personal information with, the greater the risk of the user's information being stolen by a breach at one of the entities. Further, a user may only desire to share certain pieces of personal information with an entity or individual for limited purposes or limited in time.

Thus, it may be beneficial to provide exemplary systems and methods which allow users to control the use of user information to overcome at least some of the deficiencies described herein.

SUMMARY

Aspects of the disclosed technology include systems and methods for controlling data access through the interaction of a short-range transceiver, such as a contactless card, with a client device. Data access control may be provided in the context of personal user data, including handling requests to obtain access to personal user data via the interaction of a short-range transceiver, such as a contactless card, with a client device such that the personal user data is only provided to service providers who are authorized to review the data and disclosure of certain account identifier information, or account login information, need not be disclosed to service providers requesting access to personal user data.

Embodiments of the present disclosure provide a data access control system, comprising: a database storing information comprising a user identifier and a user key associated with a user, and a service provider identifier and a service provider key associated with a service provider; a server configured for data communication with a client device associated with the service provider; a contactless card associated with the user, the contactless card comprising a communications interface, a processor, and a memory, the memory storing an applet, a user token, and personal user data associated with the user, wherein the personal user data is encrypted using the user key; a client application comprising instructions for execution on the client device, the client application configured to: in response to a tap action between the contactless card and the client device: receive the user token from the contactless card, and transmit to the server a service provider token, the user token, and a request for a data access key, wherein the service provider token is associated with the service provider; receive from the server the data access key; receive from the contactless card the encrypted personal user data; and using the data access key, decrypt the encrypted personal user data; and, a processor in data communication with the server and the database, the processor configured to: receive from the client device the service provider token, the user token, and the request for the data access key; identify the service provider based on the service provider token; identify the user based on the user token; verify that the service provider is authorized to receive access to the personal user data; and transmit to the client device the data access key.

Embodiments of the present disclosure provide a method for controlling data access, comprising: establishing a database storing information comprising a user identifier and a user key associated with a user, and a service provider identifier and a first service provider key associated with a service provider; receiving from a first client device associated with the service provider, via a network, a service provider token and a request for a data access key to access personal user data stored on a contactless card associated with the user, the personal user data encrypted using the user key, the request generated in response to a tap action between the contactless card and the first client device, the request accompanied by a user token stored on the contactless card; identifying the service provider based on the service provider token; identifying the user based on the user token; verifying that the service provider is authorized to receive access to personal user data stored on the contactless card; generating the data access key based on the user key; and transmitting to the first client device the data access key.

Embodiments of the present disclosure provide a method for controlling data access, comprising: establishing a database storing information comprising a user identifier and a user key associated with a user, and a service provider identifier and a service provider key associated with a service provider; providing a contactless card comprising a communications interface, a processor, and a memory, the memory storing an applet and a user token, wherein the communications interface is configured to support at least one of near field communication, Bluetooth, or Wi-Fi, and wherein the contactless card is associated with the user; providing a client application comprising instructions for execution on a client device associated with the service provider, the client application configured to: in response to a tap action between the contactless card and the client device: receive the user token from the contactless card, and transmit, to a server, a service provider token, the user token, and a request for a data access key, wherein the service provider token is associated with the service provider; receive from the server the data access key and a link to a data repository storing encrypted personal user data associated with the user, wherein the data access key is generated based on the user key; transmit to the data repository, via the link, a request for the encrypted personal user data; receive from the data repository the encrypted personal user data; and using the data access key, decrypt the encrypted personal user data; receiving from the client device, via a network, a service provider token and the request for the data access key to access the personal user data associated with the user, the request accompanied by the user token; identifying the service provider based on the service provider token; identifying the user based on the user token; verifying that the service provider is authorized to receive access to the personal user data associated with the user; generating the link to the data repository storing the encrypted personal user data; generating the data access key based on the user key; and transmitting to the client device the data access key and the link to the data repository storing the encrypted personal user data.

Further features of the disclosed design, and the advantages offered thereby, are explained in greater detail hereinafter with reference to specific example embodiments described below and illustrated in the accompanying drawings.

BRIEF DESCRIPTION OF THE DRAWINGS

FIG. 1C is a diagram illustrating a sequence for providing data access control according to one or more example embodiments.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Exemplary embodiments of the disclosed systems and methods provide for controlling data access through the interaction of a short-range transceiver, such as a contactless card, with a client device. Data access control may be provided in the context of controlling access to personal user data. Requests for access to personal user data may be handled via the interaction of a short-range transceiver, such as a contactless card, with a client device such that the personal user data is only provided to service providers who are authorized to review the data, and disclosure of certain account identifier information, or account login information, need not be disclosed to service providers requesting access to personal user data. Benefits of the disclosed technology may include improved data security for personal user data, improved access to personal user data when access is required without user response or intervention (such as, e.g., during an emergency), and improved user experience.

Figure 1A:
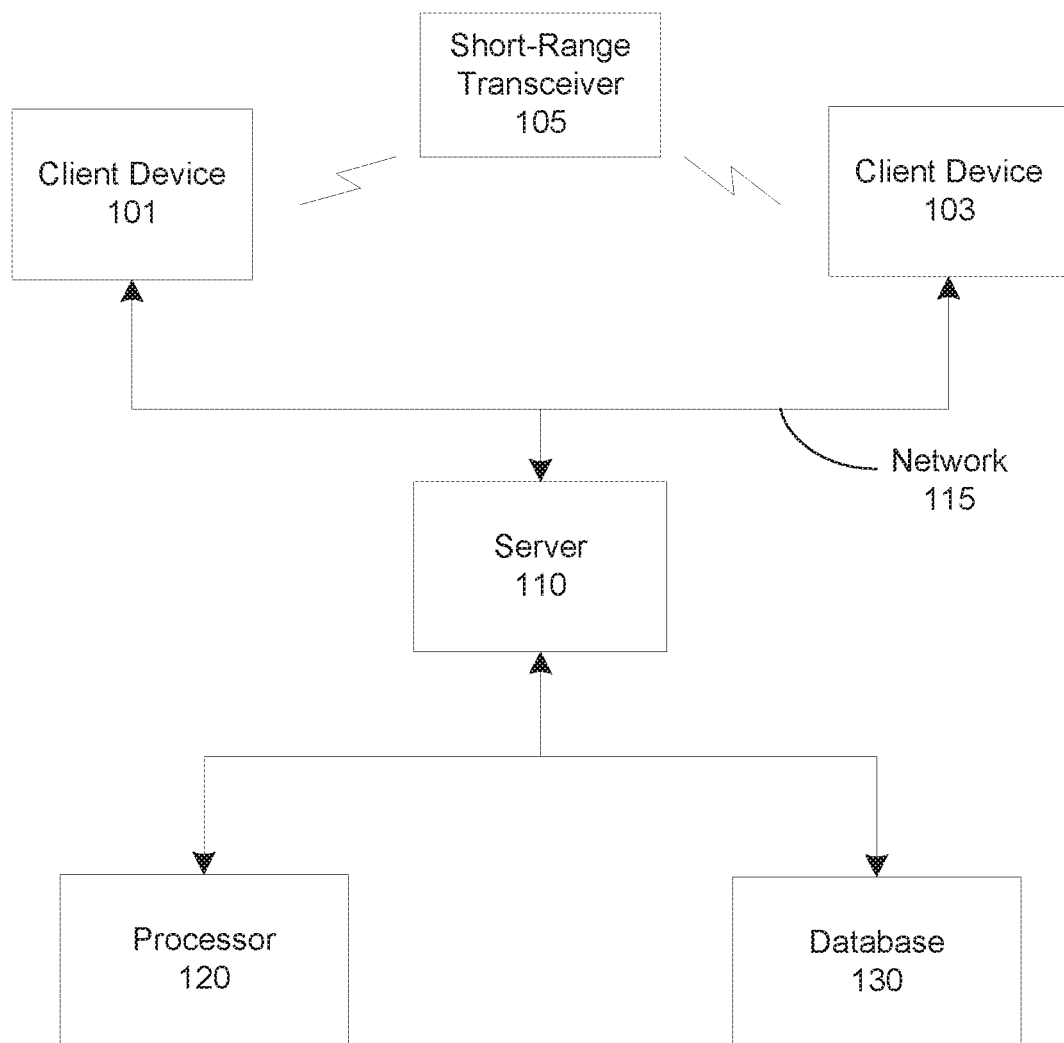
FIG. 1A is a diagram of a data access control system according to one or more example embodiments.

FIG. 1A shows a diagram illustrating a data access control system 100 according to one or more example embodiments. As discussed further below, system 100 may include client device 101, client device 103, short-range transceiver 105, server 110, processor 120 and database 130. Client device 101 and client device 103 may communicate with server 110 via network 115. Although FIG. 1 illustrates certain components connected in certain ways, system 100 may include additional or multiple components connected in various ways.

System 100 may include one or more client devices, such as client device 101 and/or client device 103, which may each be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. Each of client devices 101 and 103 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. Additional features that may be included in a client device, such as client device 101 and/or client device 103, are further described below with reference to FIG. 2.

System 100 may include one or more short-range transceivers, such as short-range transceiver 105. Short-range transceiver 105 may be in wireless communication with a client device, such as client device 101 and/or client device 103, within a short-range communications field such as, for example, near field communication (NFC). Short-range transceiver 105 may include, for example, a contactless card, a smart card, or may include a device with a varying form factor such as a fob, pendant or other device configured to communicate within a short-range communications field. In other embodiments, the short-range transceiver 105 may be the same or similar as the client devices 101, 103. Additional features that may be included in a short-range transceiver, such as such as short-range transceiver 105, are further described below with reference to FIG. 3.

System 100 may include one or more servers 110. In some example embodiments, server 110 may include one or more processors (such as, e.g., a microprocessor) which are coupled to memory. Server 110 may be configured as a central system, server or platform to control and call various data at different times to execute a plurality of workflow actions. Server 110 may be a dedicated server computer, such as bladed servers, or may be personal computers, laptop computers, notebook computers, palm top computers, network computers, mobile devices, or any processor-controlled device capable of supporting the system 100.

Server 110 may be configured for data communication (such as, e.g., via a connection) with one or more processors, such as processor 120. In some example embodiments, server 110 may incorporate processor 120. In some example embodiments, server 110 may be physically separate and/or remote from processor 120. Processor 120 may be configured to serve as a back-end processor. Processor 120 may be configured for data communication (such as, e.g., via a connection) with database 130 and/or to server 110. Processor 120 may include one or more processing devices such as a microprocessor, RISC processor, ASIC, etc., along with associated processing circuitry. Processor 120 may include, or be connected to, memory storing executable instructions and/or data. Processor 120 may communicate, send or receive messages, requests, notifications, data, etc. to/from other devices, such as client devices 101 and/or 103, via server 110.

Server 110 may be configured for data communication (such as, e.g., via a connection) with one or more databases, such as database 130. Database 130 may be a relational or non-relational database, or a combination of more than one database. In some example embodiments, server 110 may incorporate database 130. In some example embodiments, database 130 may be physically separate and/or remote from server 110, located in another server, on a cloud-based platform, or in any storage device that is in data communication with server 110.

Connections between server 110, processor 120 and database 130 may be made via any communications line, link or network, or combination thereof, wired and/or wireless, suitable for communicating between these components. Such network may include network 115 and/or one or more networks of same or similar type as those described herein with reference to network 115. In some example embodiments, connections between server 110, processor 120 and database 130 may include a corporate LAN.

Server 110 and/or database 130 may include user login credentials used to control access to user accounts. The login credentials may include, without limitation, user names, passwords, access codes, security questions, swipe patterns, image recognition, identification scans (e.g., driver's license scan and passport scan), device registrations, telephone numbers, email addresses, social media account access information, and biometric identification (e.g., voice recognition, fingerprint scans, retina scans, and facial scans).

Database 130 may contain data relating to one or more users, one or more service providers, and one or more accounts. Data relating to a user may include a user identifier and a user key, and may be maintained or organized in one or more accounts. Data relating to a service provider may include a service provider identifier and a service provider key, and may be maintained or organized in one or more accounts. Accounts may be maintained by (or on behalf of) and/or relate to any one or more of a variety of entities, such as, for example (and without limitation) a bank, merchant, online retailer, service provider, merchandizer, manufacturer, social media provider, provider or promoter of sporting or entertainment events, or hotel chain. For example, database 130 may include, without limitation, account identification information (e.g., account number, account owner identification number, account owner name and contact information—any one or more of which may comprise an account identifier), account characteristics (e.g., type of account, funding and trading limitations, and restrictions on access and other activity), and may include information and data pertinent to the account, including financial (such as balance information, payment history, and transaction history), social and/or personal information. Data stored in database 130 may be stored in any suitable format, and may be encrypted and stored in a secure format to prevent unauthorized access. Any suitable algorithm/procedure may be used for data encryption and for authorized decryption.

Server 110 may be configured to communicate with one or more client devices, such as such as client device 101 and/or client device 103, via one or more networks, such as network 115. Network 115 may include one or more of a wireless network, a wired network or any combination of wireless network and wired network, and may be configured to connect client devices 101 and/or 103 to server 110. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more example embodiments, network 115 may comprise a plurality of interconnected networks, such as, for example, the Internet, a service provider's network, a cable television network, corporate networks, such as credit card association networks, a LAN, and/or home networks.

In some example embodiments, server 110 may access records, including records in database 130, to determine a method or methods for communicating with client device 101 and/or client device 103. The communication method may include an actionable push notification with an application stored on client device 101 and/or client device 103. Other communication methods may include a text message or an e-mail, or other messaging techniques appropriate in a network-based client/server configuration. Messages or requests by client devices 101 and/or 103 may be communicated to server 110 via an application on the client device, or may be sent by a text message or an e-mail, or other messaging techniques appropriate in a network-based client/server configuration. Communications originating with client device 101 or client device 103 may be sent to server 110 using the same communications method as communications originating with server 110, or via a different communications method.

Figure 1B:
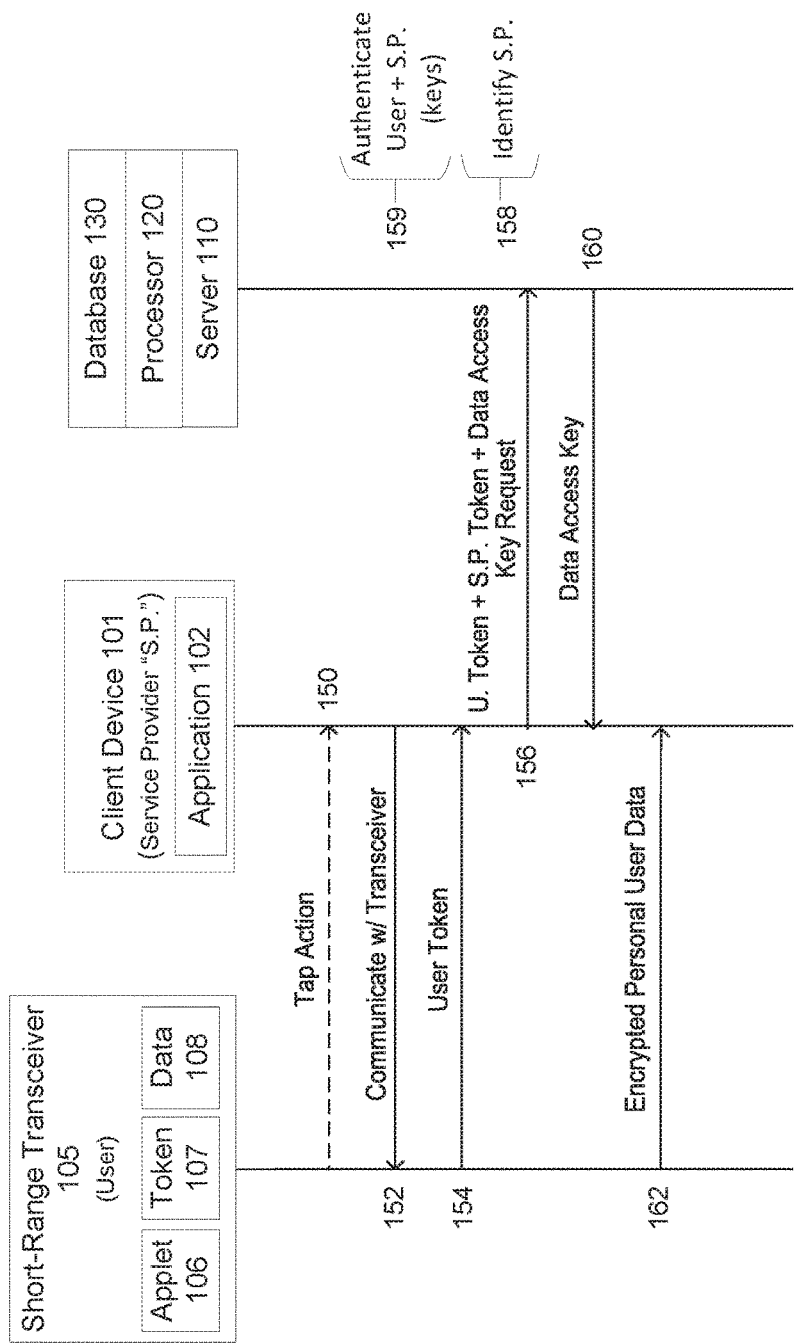
FIG. 1B is a diagram illustrating a sequence for providing data access control according to one or more example embodiments.

FIG. 1B shows a diagram illustrating a sequence for providing data access control according to one or more example embodiments, which may include a request by a service provider for a data access key to access or decrypt personal user data stored on a short-range transceiver. FIG. 1B references similar components of example embodiment system 100 as illustrated in FIG. 1A. Client device 101 may be associated with a service provider. The service provider may have an associated service provider token. Client device 101 may include application 102, which may include instructions for execution by client device 101. Client device 101 may include features further described below with reference to FIG. 2. Application 102 may be configured to provide a user interface for the service provider when using client device 101. Application 102 may be configured to communicate, via client device 101, with other client devices, with short-range transceiver 105, and with server 110. Application 102 may be configured to receive requests and send messages as described herein with reference to client device 101. Service provider information and user information, including identifiers and/or keys, may be stored in database 130.

Short-range transceiver 105 may be associated with a user. Short-range transceiver 105 may include, for example, a contactless card, and may include features further described below with reference to FIG. 3. Short-range transceiver 105 may have memory storing an applet 106 and/or a token 107, and storing personal user data 108. Token 107 and personal user data 108 may be associated with the user.

A token may be used to increase security through token authorization. Server 110 may send a validation request to a client device, such as client device 101, receive responsive information from the client device, and if validated, send a validation token back to the client device. The validation token may be based on a pre-determined token, or may be a dynamic token based on an algorithm that can be secret and known only to server 110 and the client device; the algorithm may include live parameters independently verifiable by the participants, such as the temperature at a particular location or the time. The token may be used to verify the identity of the service provider or the user. The validation request and/or validation token may be based on token 107 stored on short-range transceiver 105.

Personal user data 108 may include personal user information or data that may be of a sensitive or confidential nature, such as, for example, personal health data, social security number, family contacts, etc. (including types of data identified herein with reference to FIG. 3). Personal user data 108 may be encrypted and stored in a secure format to prevent unauthorized access.

In some example embodiments, personal user data may include personal health data such as, e.g., height, weight, blood type, prescription medications, allergies, emergency contacts, treatment or DNR instructions, etc. Personal user data may also include personal identifying data such as name, gender, date of birth, etc. A service provider using client device 101 may be, e.g., a first responder, an emergency team member, or an emergency health care provider or technician, and may be associated with a service entity, such as a fire or ambulance department, a police department, a hospital, etc.

In some example embodiments, application 102 may display an instruction on client device 101 prompting the service provider to initiate a tap action between short-range transceiver 105 and client device 101. As used herein, a tap action may include tapping short-range transceiver 105 against client device 101 (or vice-versa). For example, if short-range transceiver 105 is a contactless card and client device 101 is a mobile device, the tap action may include tapping the contactless card on a screen or other portion of client device 101. However, a tap action is not limited to a physical tap by short-range transceiver 105 against client device 101, and may include other gestures, such as, e.g., a wave or other movement of short-range transceiver 105 in the vicinity of client device 101 (or vice-versa).

At label 150, there may be a tap action between short-range transceiver 105 and client device 101. The tap action may be in response to a prompt displayed on client device 101.

At label 152, application 102 may communicate (via client device 101) with short-range transceiver 105 (e.g., after short-range transceiver 105 is brought near client device 101). Communication between application 102 and short-range transceiver 105 may involve short-range transceiver 105 (such as, e.g., a contactless card) being sufficiently close to a card reader (not shown) of the client device 101 to enable NFC data transfer between application 102 and short-range transceiver 105, and may occur in conjunction with (or response to) a tap action between short-range transceiver 105 and client device 101 (such as, e.g., the tap action at label 150). The communication may include exchange of data or commands to establish a communication session between application 102 and short-range transceiver 105. The exchange of data may include transfer or exchange of one or more keys, which may be preexisting keys or generated as session keys. In some example embodiments, the communication may occur upon entry of short-range transceiver 105 into a short-range communication field of client device 101 prior to a tap action between short-range transceiver 105 and client device 101.

At label 154, short-range transceiver 105 may send user token 107 associated with the user to application 102. Token 107 may include a user identifier. In some example embodiments, user token 107 may include a key associated with the user. In some example embodiments, the sending of token 107 to application 102 may be in conjunction with (or response to) a tap action between short-range transceiver 105 and client device 101 (such as, e.g., the tap action at label 150). In some example embodiments, the sending of token 107 to application 102 may occur upon entry of short-range transceiver 105 into a short-range communication field of client device 101 prior to a tap action between short-range transceiver 105 and client device 101.

At label 156, application 102 may send user token 107 to server 110, along with a service provider token associated with the service provider and a request for a data access key. This may be carried out in response to a tap action between short-range transceiver 105 and client device 101 (such as, e.g., the tap action at label 150). The data access key would enable the service provider to decrypt the encrypted personal user data 108.

At label 158, processor 120 may receive (e.g. via server 110) the user token, the service provider token, and the data access key request. Processor 120 may use the user token to identify the user. Processor 120 may use the service provider token to identify the service provider as the sender of the data access key request. In some example embodiments, identifying the service provider may be carried out by using a service provider identifier in the token to look up information in database 130. In some example embodiments, at label 159, if the service provider token includes a key associated with the service provider, processor 120 may use the service provider key to authenticate the service provider; likewise, if the user token includes a key associated with the user, processor 120 may use the user key to authenticate the user. Based on the identity of the service provider (and as such identity may be authenticated), processor 120 may verify whether the service provider is authorized to receive the data access key to decrypt—and thereby obtain access to—personal user data 108. In an example embodiment, the service provider key may be available to a service provider and valid for a limited period of time, such as, e.g., a daily, weekly, monthly or other basis. Client device 101 may transmit to server 110 a request for the service provider key at intervals when a new key becomes available (e.g., daily, weekly, monthly or other basis). Receiving the service provider key by client device 101 does not require the service provider to be in the vicinity of short-range transceiver 105, and the service provider key may be requested or received by client device 101 independently of any tap action with short-range transceiver 105.

At label 160, processor 120 may send the data access key to client device 101. As mentioned above, processor 120 may verify that the service provider is authorized to receive the data access key. The data access key may be stored in database 130, or may be generated based on the user key, on the service provider key, or on a combination of both the user key and the service provider key. The user key may be stored in database 130 or included in user token 107. The service provider key may be stored in database 130 or included in the service provider token received from client device 101.

In an example embodiment, processor 120 may instead send a denial notification (not shown) to client device 101, indicating that the service provider is not authorized to receive the data access key.

At label 162, short-range transceiver 105 may send encrypted personal user data 108 to application 102 via client device 101. Of note, the timing of transmission of encrypted personal user data 108 by short-range transceiver 105 to client device 101, in relation to the other events described with respect to FIG. 1B, is not critical. The encrypted personal user data 108 may be sent upon the first tap action, or at any time including after receipt of the data access key by client device 101.

Application 102 may be configured to receive, decrypt, and access encrypted personal user data 108 using the received data access key. In some embodiments, application 102 may cause the display of the personal user data on client device 101. In some embodiments, application 102 may be permitted to store the personal user data on client device 101 for retrieval on a time-limited, or limited number of uses, basis.

In one or more example embodiments, access by the service provider to personal user data may be limited in accordance with data control parameters. In an example embodiment, data control parameters may be stored in database 130. In an example embodiment, data control parameters may be stored in memory of short-range transceiver 105. Data control parameters stored in memory of short-range transceiver 105 may be sent to application 102 and used by application 102 to limit access by the service provider to personal user data. Applet 106 may be configured to receive the data control parameters and store the data control parameters in in memory of short-range transceiver 105.

In one or more example embodiments, data control parameters may be used to limit access by the service provider to personal user data in one or more ways. For example, the data control parameters may permit access only for a specific or limited period of time. As another example, the data control parameters may permit access to a single use by the service provider. As another example, the data control parameters may permit access only when short-range transceiver 105 is detected within range of a short-range communication field of client device 101. In one or more embodiments, the user may be prompted to confirm that the service provider may access the personal user data. In one or more embodiments, the user may pre-approve access to personal data by service providers, such that the user would not need to give permission at the time a service provider attempts to gain data access. The user may confirm or pre-approve access to personal user data by various means, including by tapping the user's short-range transceiver to a client device in response to a prompt.

In an example embodiment, the personal user data may be stored in database 130 and may be updated. The updated personal user data may be stored in database 130 and transmitted to client device 101 upon request for the personal user data.

In an example embodiment, application 102 may be launched in response to a tap action between short-range transceiver 105 and client device 101.

FIG. 1C shows a diagram illustrating a sequence for providing data access control according to one or more example embodiments, which may include a request by a service provider for a data access key to access or decrypt personal user data stored on a short-range transceiver. FIG. 1C references similar components of example embodiment system 100 as illustrated in FIG. 1A and similar features of example embodiment system 100 as illustrated in FIG. 1B, including features described above with respect to labels 150-159 (which are not repeated here). The service provider referenced in the description above relating to FIG. 1B will be referred to as the first service provider in describing FIG. 1C. Referring to FIG. 1C, upon identifying the first service provider as the sender of a data access key request for access to personal user data of the user, according to procedures described above with reference to labels 150-159, it may be determined that two person approval is required.

Responding to the two person approval requirement may involve client device 103 associated with a second service provider. The second service provider may be associated with the same service entity as the first service provider (referenced above), or may be associated with an entity related to that service entity, or associated with a different entity. Client device 103 may include application 104, which may include instructions for execution by client device 103. Client device 103 may include features further described below with reference to FIG. 2. Application 104 may be configured to provide a user interface for the second service provider when using client device 103. Application 104 may be configured to communicate, via client device 103, with other client devices, with short-range transceiver 105, and with server 110. Application 104 may be configured to receive requests and send messages as described herein with reference to client device 103.

At label 164, processor 120 may send (e.g. via server 110) a two person approval notice to client device 101, notifying the first service provider that a second service provider is needed to approve the data access key request. Application 102 may cause a message to be displayed on client device 101 indicating that the system is awaiting approval of the request by a second service provider. In some example embodiments, the notification may be sent to client device 103, or to both client device 101 and client device 103. Processor 120 may open a data access session with application 102 to provide tracking of the data access key request (relating to the user, via the user token) while awaiting approval.

At label 166, there may be a tap action between short-range transceiver 105 and client device 103. The tap action may be responsive to the two person approval notice. Application 104 may receive the user token 107 from short-range transceiver 105.

At label 168, application 104 may send the user token to server 110, along with a second service provider token associated with the second service provider and a data access key request; this may be in response to the tap action described above with reference to label 166. The second service provider token may include a second service provider key. Processor 120 may open a data access session with application 104 to provide separate tracking of the data access key request (relating to the user, via the user token) from the second service provider. Processor 120 may use the second service provider token to identify the second service provider as the sender of the data access key request. Based on the user token, processor 120 may determine that the data access key request made by the second service provider corresponds to the open data access key request made by the first service provider, and thus may be seeking to approve access to the personal user data by the first service provider.

At label 170, processor 120 may send an approval notice to application 104 requesting approval by the second service provider of the data access key request submitted by the first service provider.

Figure 5:
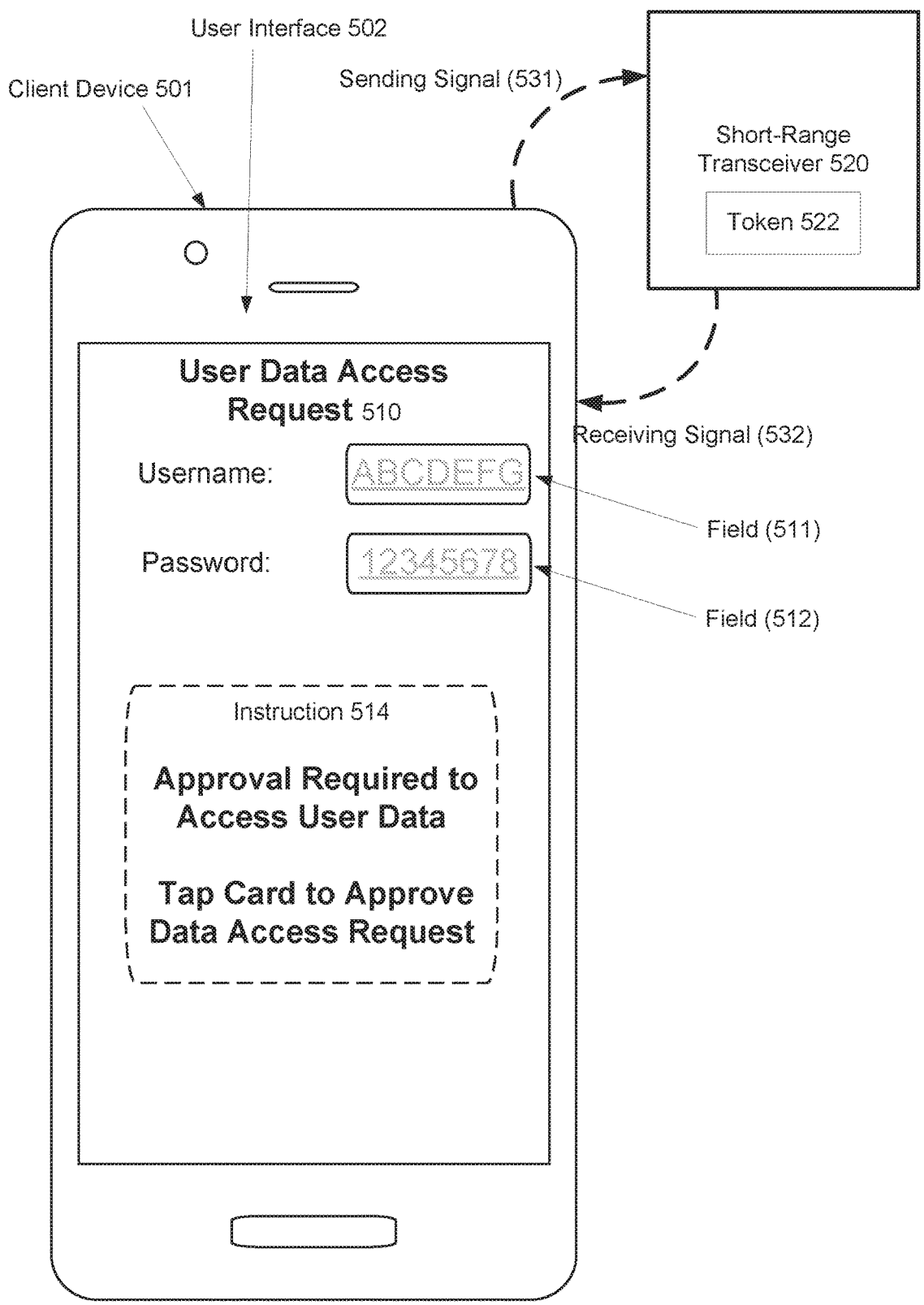
FIG. 5 is diagram illustrating interaction between a client device and a short-range transceiver used in a data access control system according to one or more example embodiments.

Application 104 may display an instruction on client device 103 for the second service provider to approve the data access key request made by the first service provider. In some example embodiments, the display may instruct the second service provider to tap short-range transceiver 105 with/against client device 103 to indicate approval (e.g., as shown in FIG. 5). In some example embodiments, the display may instruct the second service provider to press a button (not shown in FIG. 5) to indicate approval. In one or more example embodiments, the display on client device 103 of an instruction to approve the data access key request may be in response to the approval notice of label 170. In one or more example embodiments, the display on client device 103 of an instruction to approve the data access key request may be in response to the two person approval notice of label 164.

At label 172, once the second service provider has acted (e.g., by a tap action or pressing a button) to indicate approval, application 104 may send an approval message to server 110. Based on the approval message, processor 120 may determine that the second service provider has approved the data access key request by the first service provider.

In an example embodiment, in response to a two person approval notice, application 102 may display on client device 101 a code (such as a QR code or a numeric code), to be scanned by or otherwise entered into client device 103. Application 104 may transmit the code (as scanned or entered into client device 103) to server 110 to indicate approval of the data access key request. Based on the transmitted code, processor 120 may determine that the second service provider has approved the data access key request by the first service provider.

At label 174, processor 120 may send the data access key to client device 101. The data access key may be stored in database 130, or may be generated based on the user key, on the first service provider key, or on a combination of the user key and the first service provider key, or on a combination of the user key, the first service provider key and the second service provider key. The user key may be stored in database 130 or included in user token 107. The first service provider key may be stored in database 130 or included in the first service provider token received from client device 101. The second service provider key may be stored in database 130 or included in the second service provider token received from client device 103.

At label 176, short-range transceiver 105 may send encrypted personal user data 108 to application 102 via client device 101. Of note, the timing of transmission of encrypted personal user data 108 by short-range transceiver 105 to client device 101, in relation to the other events described with respect to FIG. 1B or 1C, is not critical. The encrypted personal user data 108 may be sent upon the first tap action, or at any time including after receipt of the data access key by client device 101.

As discussed above with reference to FIG. 1B, application 102 may be configured to receive, decrypt, and access encrypted personal user data 108 using the received data access key, including, for example, causing the display of the personal user data on client device 101, and/or storing the personal user data on client device 101 for retrieval on a time-limited, or limited number of uses, basis. In an example embodiment, the received data access key may be stored on client device 101, and application 102 may display the personal user data on the client device only if the data access key remains stored on the client device.

In an example embodiment, application 104 may be launched in response to a tap action between short-range transceiver 105 and client device 103.

Figure 2:
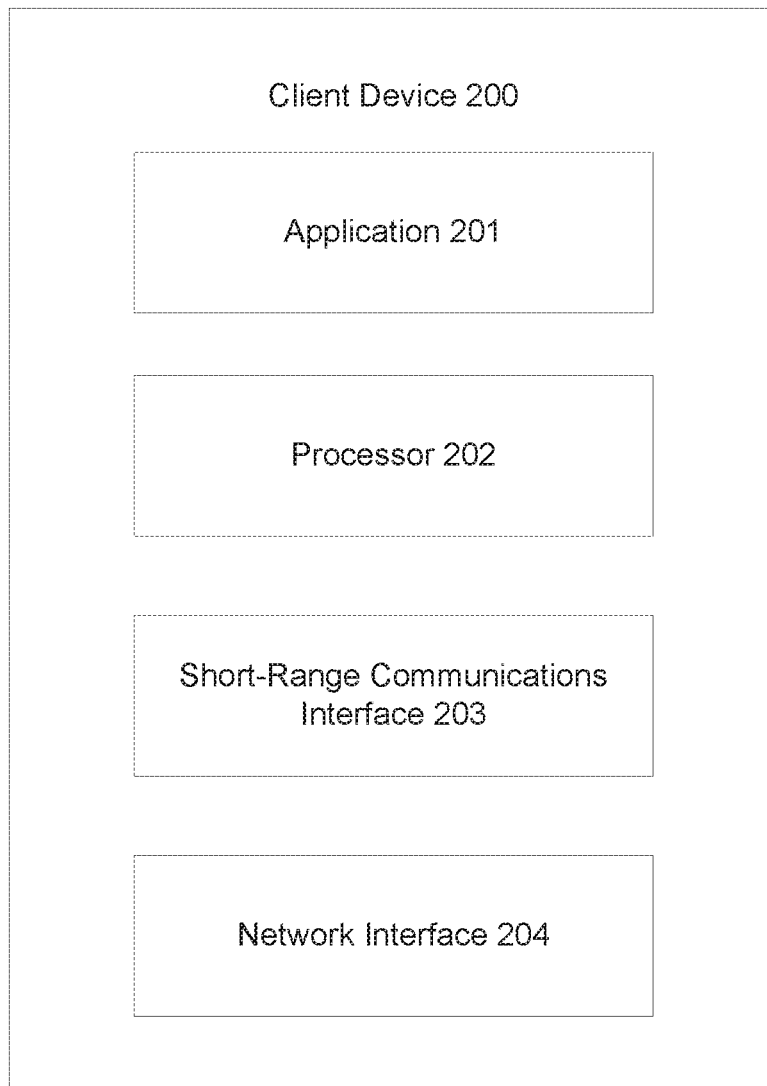
FIG. 2 illustrates components of a client device used in a data access control system according to one or more example embodiments.

FIG. 2 illustrates components of a client device 200 used in a data access control system according to one or more example embodiments. In one or more example embodiments, client device 200 may be one or more of client devices 101 and/or 103, described above with reference to FIG. 1A and FIGS. 1B-1C. Client device 200 may include one or more applications 201, one or more processors 202, a short-range communications interface 203, and a network interface 204. Application 201 may include a software application or executable program code to be executed on processor 202 and configured to carry out features described herein for any of the client devices, such as client devices 101 and/or 103, and/or any of the features described herein with reference to application 102. Application 201 may be configured, for example, to transmit and/or receive data with other devices via client device 101, such as, e.g., via short-range communications interface 203 and/or network interface 204. For example, application 201 may be configured to initiate one or more requests, such as near field data exchange requests to a short-range transceiver (such as a contactless card). Application 201 may also be configured to provide a user interface via a display (not shown) for a user of the client device. Application 201 may be stored in memory in client device 200; the memory may include a read-only memory, write-once read-multiple memory and/or read/write memory, e.g., RAM, ROM, and EEPROM.

Processor 202 may include one or more processing devices such as a microprocessor, RISC processor, ASIC, etc., and may include associated processing circuitry. Processor 202 may include, or be connected to, memory storing executable instructions and/or data, as may be necessary or appropriate to control, operate or interface with the other features of client device 200, including application 201. Processor 202 (including any associated processing circuitry) may contain additional components including processors, memories, error and parity/CRC checkers, data encoders, anticollision algorithms, controllers, command decoders, security primitives and tamperproofing hardware, as necessary to perform the functions described herein.

Short-range communications interface 203 may support communication via a short-range wireless communication field, such as NFC, RFID, or Bluetooth. Short-range communications interface 203 may include a reader, such as a mobile device NFC reader. Short-range communications interface 203 may be incorporated into network interface 204, or may be provided as a separate interface.

Network interface 204 may include wired or wireless data communication capability. These capabilities may support data communication with a wired or wireless communication network, including the Internet, a cellular network, a wide area network, a local area network, a wireless personal area network, a wide body area network, any other wired or wireless network for transmitting and receiving a data signal, or any combination thereof. Such network may include, without limitation, telephone lines, fiber optics, IEEE Ethernet 902.3, a wide area network, a local area network, a wireless personal area network, a wide body area network or a global network such as the Internet.

Client device 200 may also include a display (not shown). Such display may be any type of device for presenting visual information such as a computer monitor, a flat panel display, or a mobile device screen, including liquid crystal displays, light-emitting diode displays, plasma panels, and cathode ray tube displays.

Client device 200 may also include one or more device inputs (not shown). Such inputs may include any device for entering information into the client device that is available and supported by the client device 300, such as a touchscreen, keyboard, mouse, cursor-control device, touchscreen, microphone, digital camera, video recorder, or camcorder. The device inputs may be used to enter information and interact with the client device 200 and, by extension, with the systems described herein.

Figure 3:
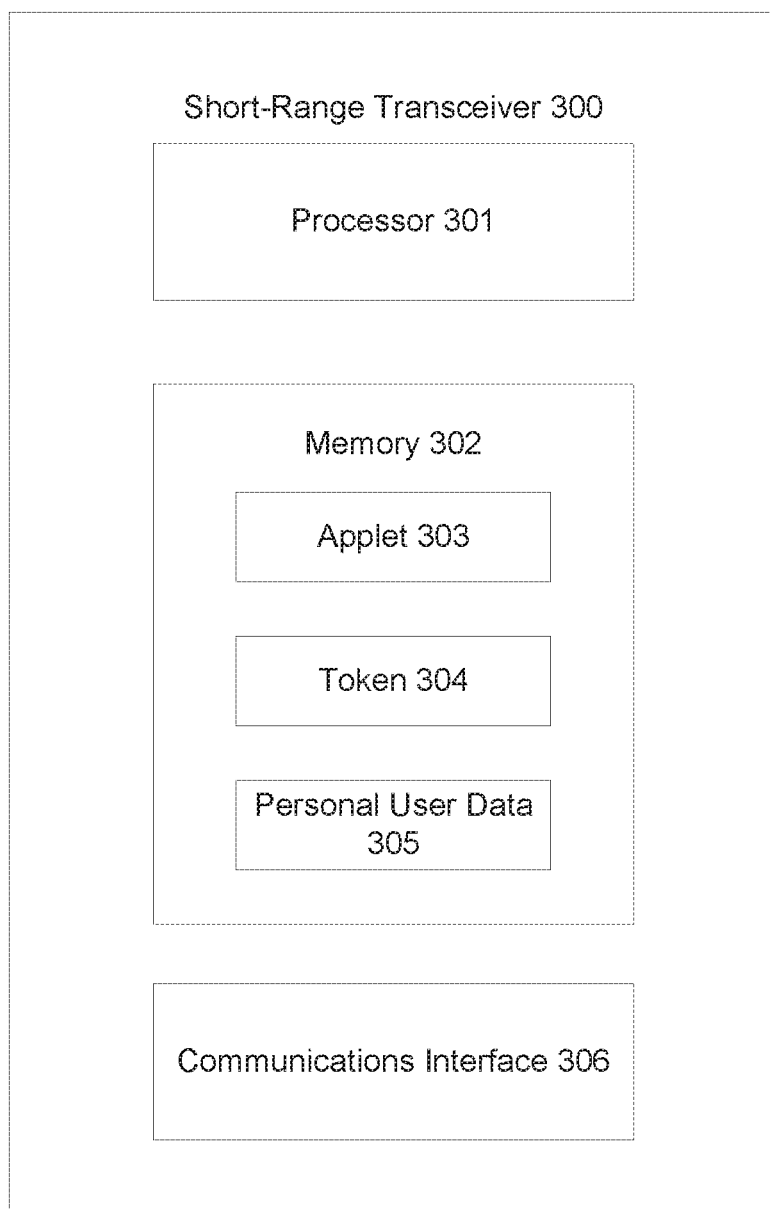
FIG. 3 illustrates components of a short-range transceiver used in a data access control system according to one or more example embodiments.

FIG. 3 illustrates components of a short-range transceiver 300 used in a data access control system according to one or more example embodiments. In one or more example embodiments, short-range transceiver 300 may be one or more of short-range transceiver 105, described above with reference to FIG. 1A and FIGS. 1B-1C. Short-range transceiver 300 may include, for example, a contactless card, or may include a device with a varying form factor such as a fob, pendant or other device configured to communicate within a short-range communications field. Short-range transceiver 300 may include a processor 301, memory 302, and short-range communications interface 306.

Processor 301 may include one or more processing devices such as a microprocessor, RISC processor, ASIC, etc., and may include associated processing circuitry. Processor 301 may include, or be connected to, memory storing executable instructions and/or data, as may be necessary or appropriate to control, operate or interface with the other features of short-range transceiver 300, including applet 303. Processor 301 (including any associated processing circuitry) may contain additional components including processors, memories, error and parity/CRC checkers, data encoders, anticollision algorithms, controllers, command decoders, security primitives and tamperproofing hardware, as necessary to perform the functions described herein.

Memory 302 may be a read-only memory, write-once read-multiple memory or read/write memory, e.g., RAM, ROM, and EEPROM. Memory 302 may be configured to store one or more applets 303, one or more tokens 304, and personal user data 305. Applet 303 may comprise one or more software applications configured to execute on processor 301, such as a Java Card applet that may be executable on a contact less card. However, it is understood that applet 303 is not limited to Java Card applets, and instead may be any software application operable on contactless cards or other devices having limited memory. Applet 303 may be configured to respond to one or more requests, such as near field data exchange requests from a client device, including requests from a device having a reader such as a mobile device NFC reader. Applet 303 may be configured to read (or write) data, including token 304 and/or personal user data 305 from (or to) memory 302 and provide such data in response to a request.

Token 304 may include a unique alphanumeric identifier assigned to a user of the short-range transceiver 300, and the identifier may distinguish the user of the short-range transceiver 300 from other users of other short-range transceivers (such as other contactless card users). In some example embodiments, token 304 may identify both a customer and an account assigned to that customer and may further identify the short-range transceiver (such as a contactless card) associated with the customer's account. In some example embodiments, token 304 may include a key unique to the user or customer with which the short-range transceiver is associated.

Personal user data 305 may be stored in memory 302, and may, e.g., be located in specific memory location or in a data file identified by file name. Personal user data 305 may include personal user information or data that may be of a sensitive or confidential nature, such as, for example, personal health data, social security number, family contacts, etc. Personal user data 305 may be encrypted and stored in a secure format to prevent unauthorized access. Any suitable algorithm/procedure (including, e.g., public/private key encryption) may be used for data encryption and for authorized decryption.

Personal user data 305 (and personal user data 108 described above with reference to FIGS. 1B-1C) may include any one or more of the following categories of data: full name, date of birth, Email address, home address, ethnicity/race, gender, place of birth, mother's maiden name, Social Security number, national ID number(s), passport number, visa permit number, driver's license number, vehicle registration plate number, genetic information, medical information, disability information, insurance details, location information, what you are doing when, status, events attended, sexual orientation, education history, grades, employment history, salary, job position/title, account information for financial, social, utility, services, or other accounts, photos, political and religious leanings and affiliation, views on controversial issues, history/background, credit score/record, sites registered on, criminal record, and/or commercially sensitive information.

Short-range communications interface 306 may support communication via a short-range wireless communication field, such as NFC, RFID, or Bluetooth. Short-range transceiver 300 may also include one or more antennas (not shown) connected to short-range communications interface 306 to provide connectivity with a short-range wireless communications field.

Figure 4:
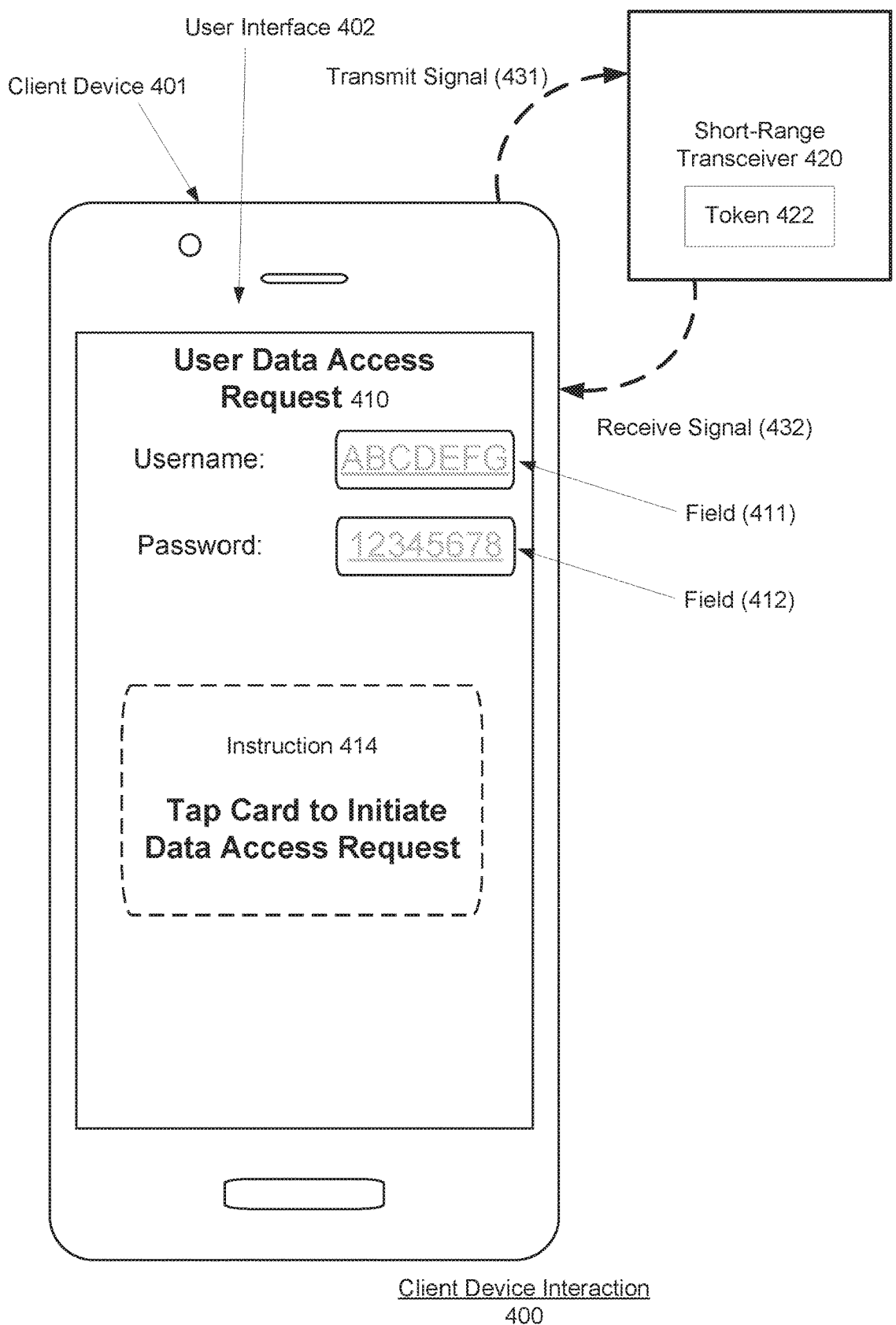
FIG. 4 is diagram illustrating interaction between a client device and a short-range transceiver used in a data access control system according to one or more example embodiments.

FIG. 4 is diagram illustrating the interaction 400 between a client device 401 and a short-range transceiver 420 used in a data access control system according to one or more example embodiments, including embodiments described above with reference to FIGS. 1A-1C. Client device 401 may be client device 101 described above with reference to FIG. 1A and FIGS. 1B-1C. Client device 401 may be associated with the (first) service provider as described above with reference to FIGS. 1B-1C. User interface 402 may be generated by application 102 described above with reference to FIGS. 1B-1C. Short-range transceiver 420 may be short-range transceiver 105 described above with reference to FIG. 1A and FIGS. 1B-1C. Upon entry of short-range transceiver 420 into a short-range communication field of client device 401 (such as, e.g., via a tap action), client device 401 may communicate with short-range transceiver 420. Client device 401 may send data or commands to short-range transceiver 420 via transmit signal 431, and may receive data from short-range transceiver 420, including token 422, via receive signal 432. Short-range transceiver 420 may also send to client device 401 encrypted personal user data (not shown). Communication between client device 401 and short-range transceiver 420 may proceed as described above with reference to FIGS. 1B-1C (e.g., client device 101 or 103 and short-range transceiver 105).

User interface 402 may present on client device 401 a screen display for a user data access request 410, which may include field 411 and field 412. If necessary, the first service provider may enter a username in field 411 and password in field 412. The screen display may include an instruction 414 prompting the first service provider to tap short-range transceiver 420 (in the example shown, short-range transceiver 420 may be a contactless card) to initiate a data access key request to obtain a data access key required to decrypt the encrypted personal user data. Instruction 414 may be a push notification from server 110 (shown in FIG. 1A and FIGS. 1B-1C). Client device 401 may transmit a data access key request to server 110 (shown in FIG. 1A and FIGS. 1B-1C) along with a user token 422 (from short-range transceiver 420) and a first service provider token in response to a tap action.

FIG. 5 is diagram illustrating the interaction 500 between a client device 501 and a short-range transceiver 520 used in a data access control system according to one or more example embodiments, including embodiments described above with reference to FIGS. 1A-1C. Client device 501 may be client device 103 described above with reference to FIG. 1A and FIG. 1C. Client device 501 may be associated with the second service provider as described above with reference to FIG. 1C. User interface 502 may be generated by application 104 described above with reference to FIG. 1C. Short-range transceiver 520 may be short-range transceiver 105 described above with reference to FIG. 1A and FIGS. 1B-1C. Upon entry of short-range transceiver 520 into a short-range communication field of client device 501 (such as, e.g., via a tap action), client device 501 may communicate with short-range transceiver 520. Client device 501 may send data or commands to short-range transceiver 520 via transmit signal 531, and may receive data from short-range transceiver 520, including token 522, via receive signal 532. Communication between client device 501 and short-range transceiver 520 may proceed as described above with reference to FIGS. 1B-1C (e.g., client device 101 or 103 and short-range transceiver 105).

User interface 502 may present on client device 501 a screen display for a user data access request 510, which may include field 511 and field 512. If necessary, the second service provider may enter a username in field 511 and password in field 512. The screen display may include an instruction 514 notifying the second service provider that two service providers are needed to approve the user data access request, and prompting the second service provider to tap short-range transceiver 520 (in the example shown, short-range transceiver 520 may be a contactless card) to complete the approval process. Instruction 514 may be a push notification from server 110 (shown in FIG. 1A and FIGS. 1B-1C). Client device 501 may transmit a user token 522 (from short-range transceiver 520) and a second service provider token to server 110 in response to a tap action.

Figure 6A:
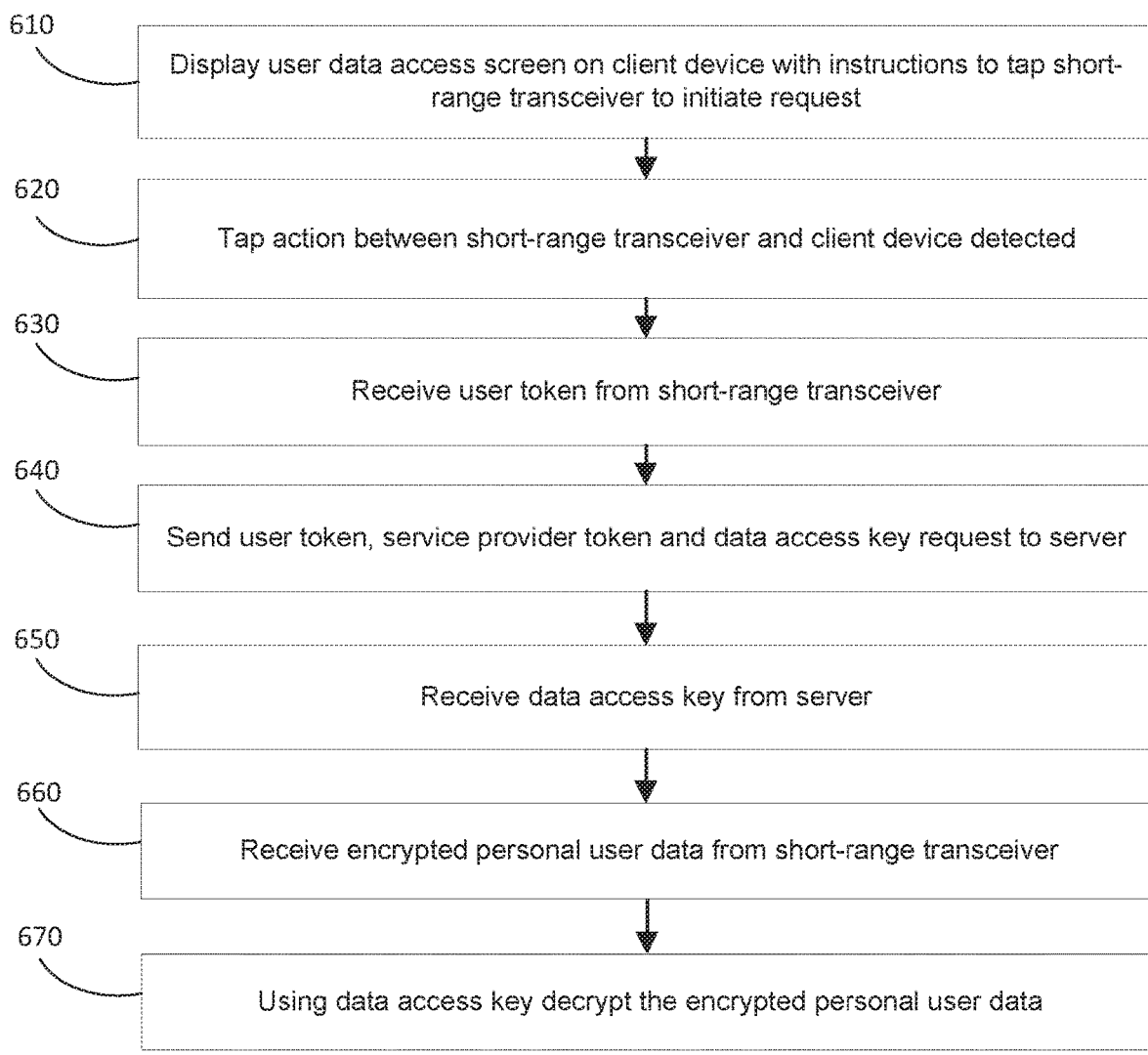
FIGS. 6A-6B provide a flowchart illustrating a method of data access control according to one or more example embodiments.

FIG. 6A is a flowchart illustrating a method of data access control 600 according to one or more example embodiments, with reference to components and features described above, including but not limited to the figures and associated description. Data access control method 600 may be carried out by application 102 executing on client device 101 associated with the (first) service provider. Short-range transceiver 105 is associated with the user.

At block 610, application 102 may cause client device 101 to display a user data access request screen (such as shown in, and described above with reference to, FIG. 4). The user data access request screen may include an instruction to tap short-range transceiver 105 with/against client device 101 to initiate a data access key request. As described above with reference to FIG. 4, short-range transceiver 420 (and, hence, short-range transceiver 105) may be a contactless card.

At block 620, a tap action may be detected between short-range transceiver 105 and client device 101.

At block 630, user token 107 may be received from short-range transceiver 105. Receiving user token 107 may be in response to the tap action of block 620. User token 107 may include a user identifier. In some example embodiments, user token 107 may include a user key associated with the user.

At block 640, user token 107 and a service provider token (associated with the service provider) may be transmitted to server 110 along with data access key request, to obtain a key for decrypting the encrypted personal user data received (or to be received) from short-range transceiver 105. Transmission of user token 107, the service provider token and the data access key request to server 110 may be in response to the tap action of block 620.

At block 650, a data access key may be received from server 110.

At block 660, the encrypted personal user data may be received from short-range transceiver 105. As discussed above, the encrypted personal user data may be received at any time during the process.

At block 670, the data access key may be used to decrypt the encrypted personal user data. As discussed above, in some embodiments, application 102 may cause the display of the personal user data on client device 101. In some embodiments, application 102 may be permitted to store the personal user data on client device 101 for retrieval on a time-limited, or limited number of uses, basis.

Figure 6B:
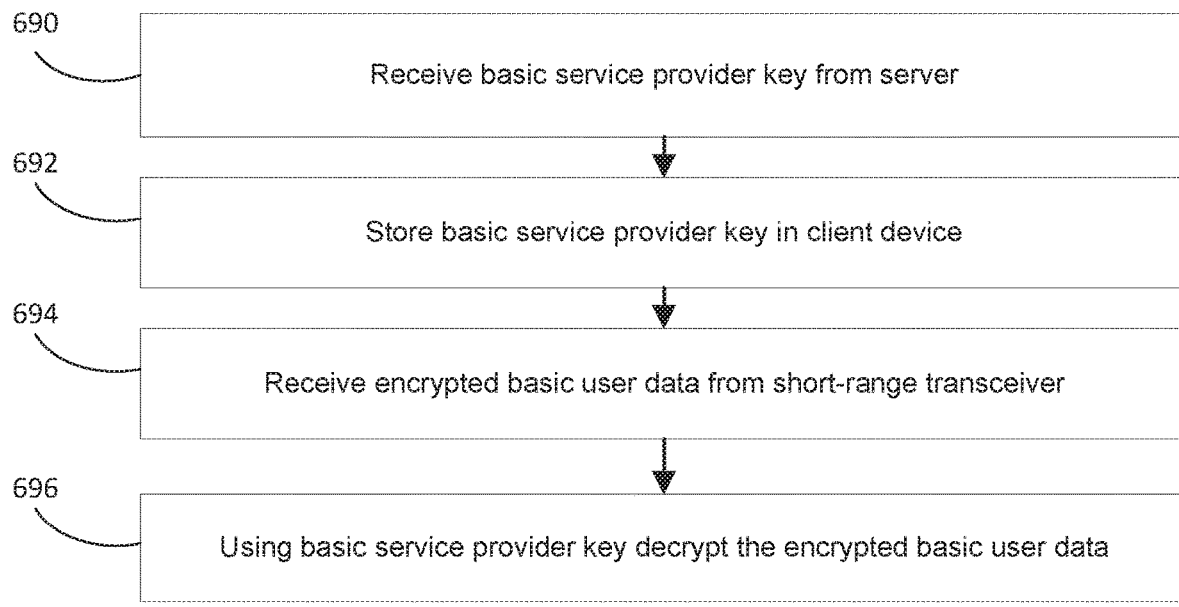

FIG. 6B is a flowchart illustrating a method of data access control 600 according to one or more example embodiments, with reference to components and features described above, including but not limited to the figures and associated description. The features described in FIG. 6B may be in addition to the features referenced in FIG. 6A. The description of blocks referenced in FIG. 6A will not be repeated here. As described above with reference to FIG. 6A, data access control method 600 may be carried out by application 102 executing on client device 101 associated with the (first) service provider. Short-range transceiver 105 is associated with the user.

Memory located on short-range transceiver 105 (such as memory 302 shown in FIG. 4) may contain basic user data, such as name, gender, and date of birth. This basic user data could be a subset of the types of data contained in the personal user data, or may be additional data, and/or may be data that is unlikely to change (or less likely to change over time than other types of personal user data). In some example embodiments, such as when personal user data includes health data, the basic user data could include certain aspects of health data, such as, for example, height, weight, allergies, prescriptions, DNR instructions, etc. The types of information that may be included in basic user data may be selectable by the user.

Basic user data may be stored in short-range transceiver memory 302 and may, e.g., be located in specific memory location or in a data file identified by file name.

The basic user data may be encrypted with a key such that it may be decrypted with a basic service provider key that may be available to service providers. The basic service key may be different from the data access key required to descript personal user data 305. In one or more embodiments a basic service provider key may be available to service providers and valid for a limited period of time, such as, e.g., a daily, weekly, monthly or other basis. The basic service provider key may be common for all personnel associated with a particular service provider entity. The basic service provider key may be stored in database 130, or may be generated by the system based on the identity of the service provider. Storing the basic service provider key (or generating the key) by the system and pushing the key to the client device provides a way of controlling access and permits access to be logged and tracked for auditing purposes.

At block 690, a basic service provider key is received from the server. The basic service provider key may be requested and/or obtained at any time, according to arrangements or protocols that the service provider (or service provider entity) may have with system 100. For example, client device 101 may transmit to server 110 a request for the basic service provider key at intervals when a new key becomes available (e.g., daily, weekly, monthly or other basis). Receiving the basic service provider key does not require the service provider to be in the vicinity of short-range transceiver 105, and the basic service provider key may be requested or received independently of any tap action with short-range transceiver 105.

At block 692, the basic service provider key may be stored in memory located in client device 101, allowing for later recall and use of the basic service provider key by the service provider at a later time.

At block 694, encrypted basic user information may be received from short-range transceiver 105. This may be in response to a tap action between short-range transceiver 105 and client device 101, or otherwise may be received at any time once short-range transceiver 105 is present within range of a short-range wireless communication field of client device 101.

At block 696, the basic service provider key may be used to decrypt the encrypted basic user data. Application 102 may cause the display of the basic user data on client device 101. In some embodiments, application 102 may be permitted to store the basic user data on client device 101 for retrieval on a time-limited, or limited number of uses, basis. In an example embodiment, the basic user data may be stored on transceiver 105 in an unencrypted format. In an example embodiment, the basic user data may be received by client device 101 in an unencrypted form and accessed without the need for a basic service provider key. Whether the basic user data is stored or provided in an unencrypted format may be determined by the user.

Figure 7A:
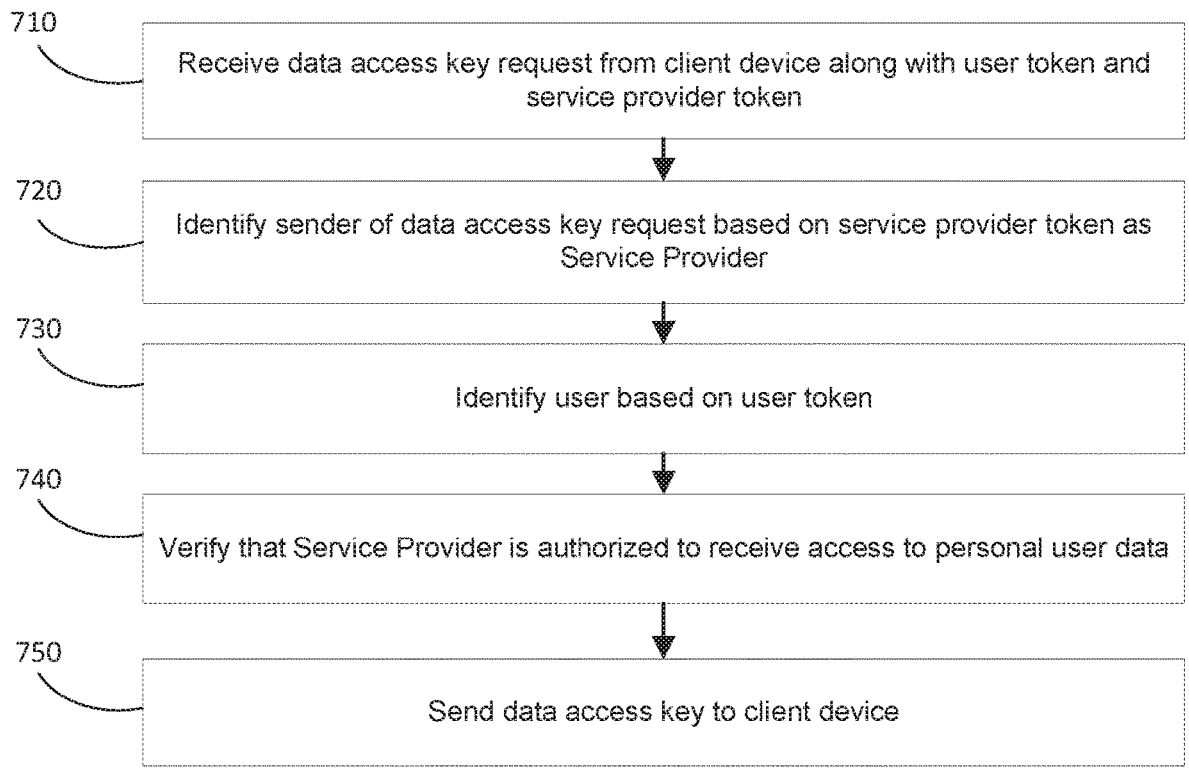
FIGS. 7A-7C provide a flowchart illustrating one or more methods of data access control according to one or more example embodiments.

FIG. 7A is a flowchart illustrating a method of data access control 700 according to one or more example embodiments, with reference to components and features described above, including but not limited to the figures and associated description. Data access control method 700 may be carried out by processor 120 in communication with, via server 110, client device 101 associated with the first service provider and/or client device 103 associated with the second service provider.

At block 710 a data access key request may be received, along with user token 107 and a service provider token (associated with the first service provider), from client device 101 associated with a first service provider, requesting a data access key to enable decryption of encrypted personal user data. Token 107 may include a user identifier. In some example embodiments, token 107 may include a user key associated with the user. In some example embodiments, the service provider token may include a first service provider key.

At block 720, the sender of the data access key request may be identified as the first service provider based on the service provider token. In some example embodiments, when the service provider token includes the first service provider key associated with the first service provider, the first service provider key may be used to authenticate the first service provider.

At block 730, the user may be identified based on received user token 107. In some example embodiments, when token 107 includes the user key associated with the user, the user key may be used to authenticate the user.

At block 740, the processor may verify that the first service provider is authorized to receive access to the personal user data (and thus authorized to obtain the data access key). Authorization may be based on the identity of the service provider, or the identity of the user, or both, and may include retrieval of information from database 130.

At block 750, a data access key may be sent to client device 101 associated with the service provider. As described above, the data access key may be stored in database 130, or may be generated based on the user key, on the first service provider key, or on a combination of the user key and the first service provider key.

Figure 7B:
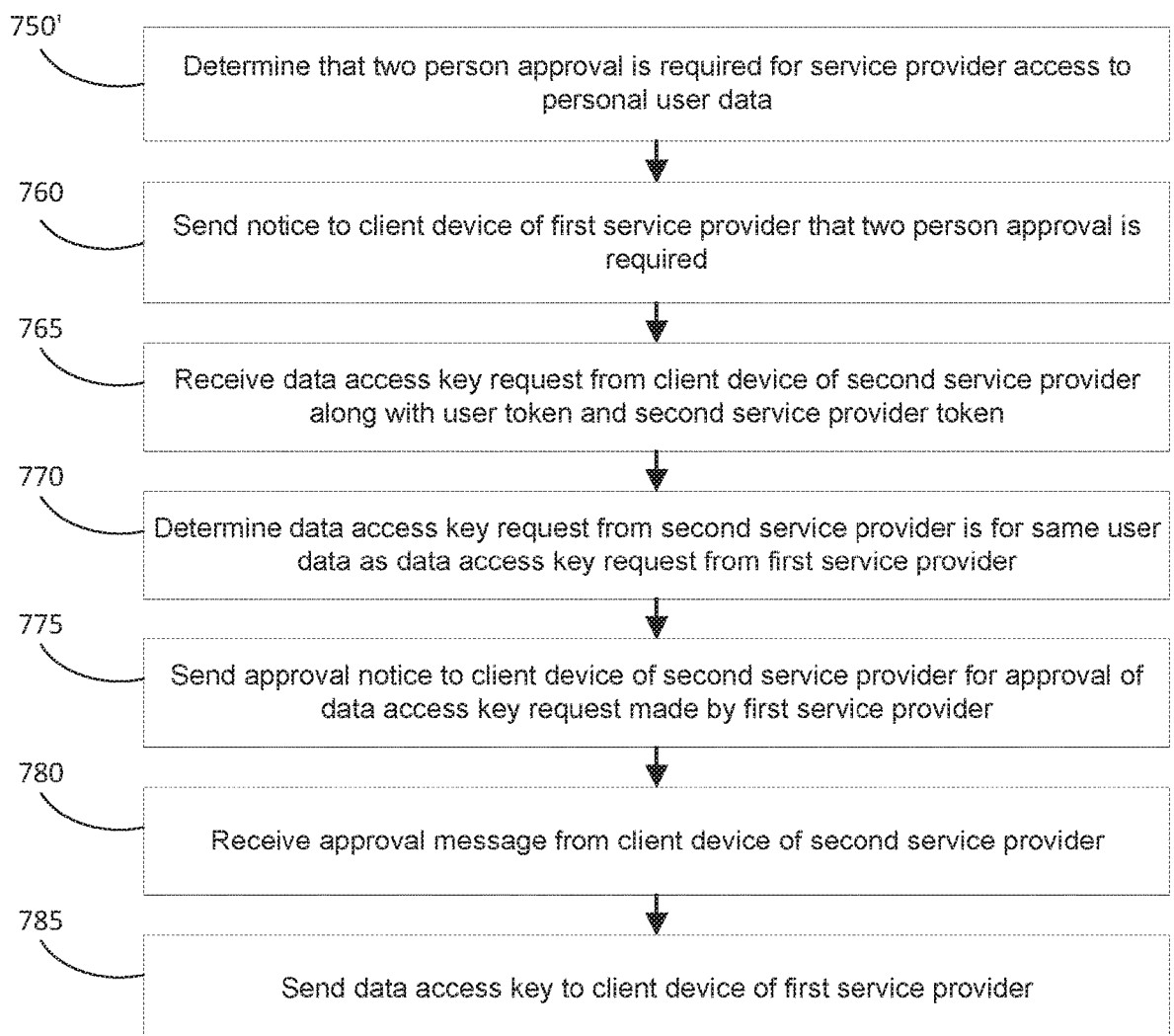

FIG. 7B is a flowchart illustrating a method of data access control 701 according to one or more example embodiments, with reference to components and features described above, including but not limited to the figures and associated description. The features described in FIG. 7B may be in addition to the features referenced in FIG. 7A. The description of blocks referenced in FIG. 7A will not be repeated here. As described above with reference to FIG. 7A, data access control method 700 may be carried out by processor 120 in communication with, via server 110, client device 101 associated with the first service provider and/or client device 103 associated with the second service provider.

According to the method in FIG. 7B, block 750 (referenced in FIG. 7A) is not carried out in the sequence shown in FIG. 7A. Instead, with reference to FIG. 7B, at block 750' it is determined that two person approval is required for service provider access to personal user data.

At block 760, a notice is sent to client 101 associated with the first service provider that two person approval requires that a second service provider must approve the data access key request.

At block 765, a data access key request may be received from client device 103 associated with the second service provider, along with a user token and a second service provider token. The second service provider token may include a second service provider key.

At block 770, it may be determined that the data access key request from client device 103 of the second service provider corresponds to the data access key request previously received from client device 101 of the first service provider.

At block 775, an approval notice may be sent to client device 103 of the second service provider seeking approval of the data access key request made by the first service provider.

At block 780, an approval message may be received from client device 103 of the second service provider indicating approval, by the second service provider, of the data access key request made by the first service provider.

At block 785, a data access key may be sent to client device 101 associated with the first service provider. As described above, the data access key may be stored in database 130, or may be generated based on the user key, on the first service provider key, or on a combination of the user key and the first service provider key, or on a combination of the user key, the first service provider key and the second service provider key.

Figure 7C:
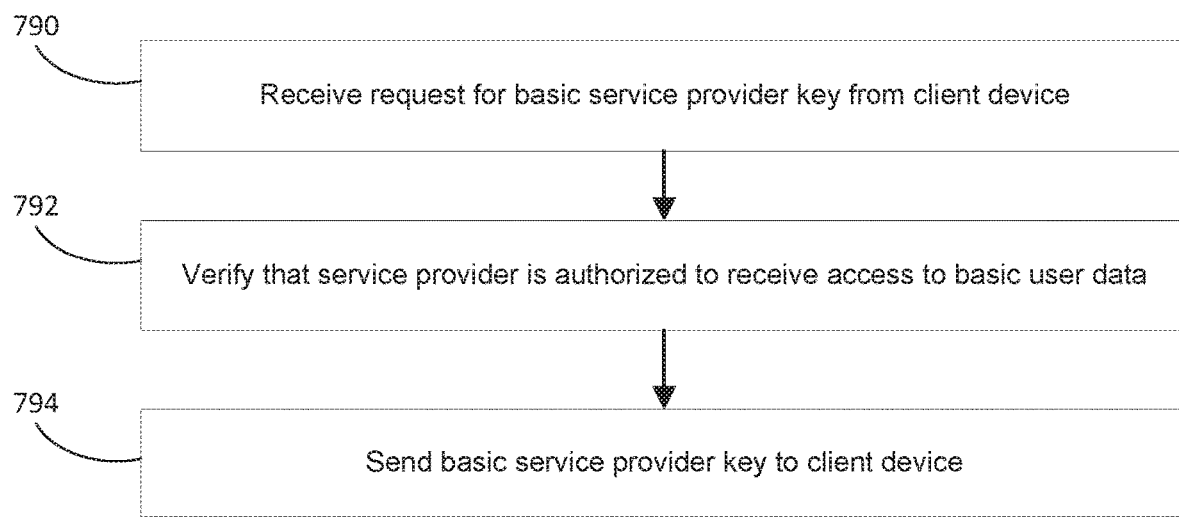

FIG. 7C is a flowchart illustrating a method of data access control 702 according to one or more example embodiments, with reference to components and features described above, including but not limited to the figures and associated description. The features described in FIG. 7C may be in addition to the features referenced in FIG. 7A or 7B. The description of blocks referenced in FIGS. 7A and 7B will not be repeated here. As described above with reference to FIGS. 7A and 7B, data access control method 700 may be carried out by processor 120 in communication with, via server 110, client device 101 associated with the first service provider and/or client device 103 associated with the second service provider.

At block 790, a request for a basic service provider key is received from client device 101. As discussed above, the basic service provider key may be requested at any time, according to arrangements or protocols that the service provider (or service provider entity) may have with system 100. Requesting the basic service provider key does not require the service provider to be in the vicinity of short-range transceiver 105, and the basic service provider key may be sent to client device 101 independently of any tap action with short-range transceiver 105.

At block 792, the processor may verify that the service is authorized to receive access to basic user data (and thus authorized to obtain a basic service provider key). Authorization may be based on the identity of the service provider, and may include retrieval of information from database 130.

At block 794, a basic service provider key may be sent to client device 101 associated with the service provider. The service provider key may be stored in database 130, or may be generated by the system based on the identity of the service provider.

Figure 8:
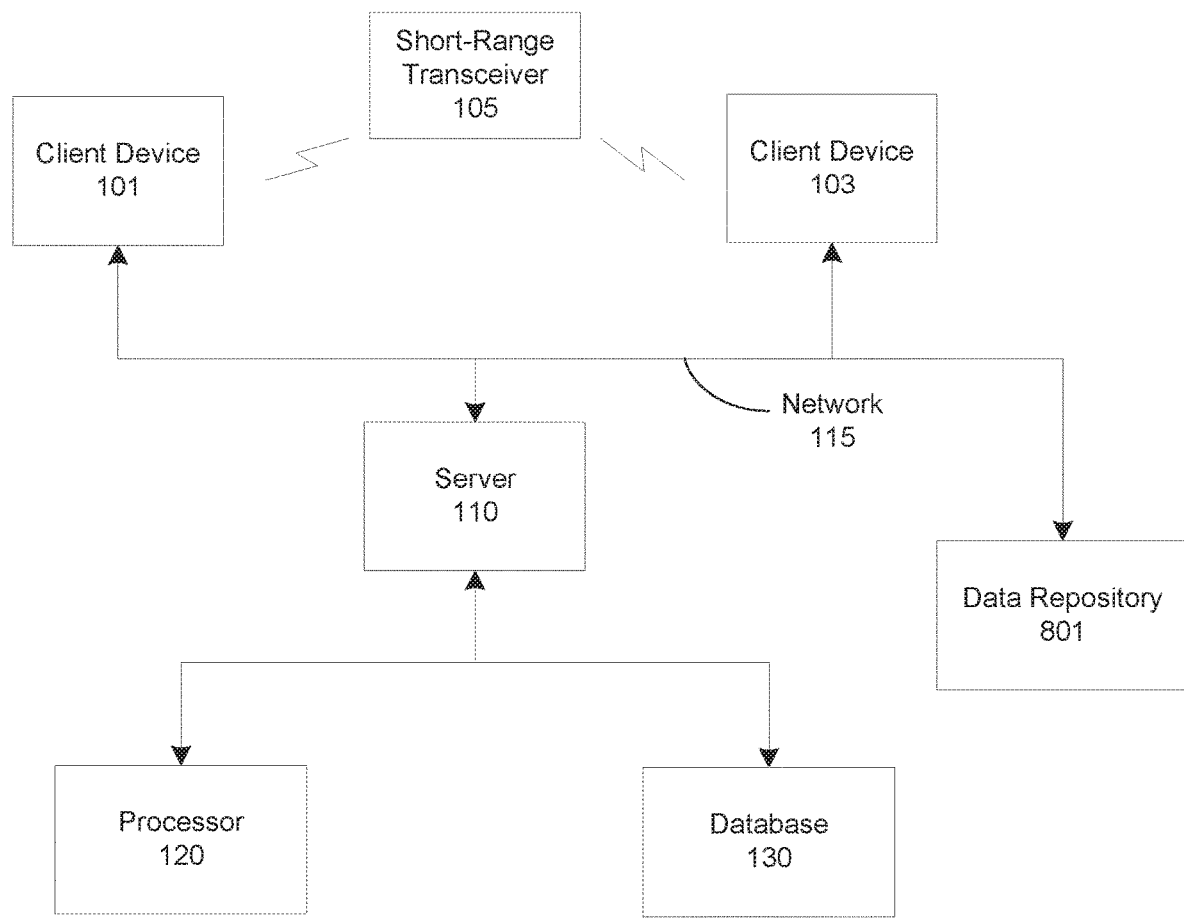
FIG. 8 is a diagram of a data access control system according to one or more example embodiments.

FIG. 8 shows a diagram illustrating a data access control system 800 according to one or more example embodiments. FIG. 8 references similar components of example embodiment system 100 as illustrated in FIG. 1A, and description of those components will not be repeated here. In addition to components relating to system 100 as illustrated in FIG. 1A and described above, system 800 may include a data repository 801. Data repository 801 may include a database having some or all of the same or similar structure, functionality or features as described above for database 130. Data repository may also include or incorporate a server having some or all of the same or similar structure, functionality or features as described above for server 110. Data repository may also include or incorporate a processor having some or all of the same or similar structure, functionality or features as described above for processor 120. Data repository is configured to store personal user data, such as personal user data of the type described above with respect to personal user data 305 in FIG. 3. Data repository may store the personal user data in an encrypted format, or may encrypt the personal user data before sending to an authorized service provider. Data repository 801 may be operated by the same or related entity as operating system 100, or may be operated by a third party.

In operation, system 800 may carry out all or many of the same functions as performed by the components of system 100, as described above, for handling a request for a data access key to access personal user data. Once system 800 verifies that the service provider is authorized to receive access to personal user data, processor 120 may generate a link to the data repository where the personal user data is stored. In an example embodiment, processor 120 may provide information (such as, e.g., an electronic address for data repository 801) in addition to or instead of the link to data repository 801.

Processor 120 may retrieve a data access key or generate a data access key as described above (including, e.g., generated based on the user key or based on the user key and service provider key). Processor 120 may send to client device 101 the data access key and the link to data repository 801 where the personal user data may be located. Upon receiving the data access key and the link to data repository 801, client device 101 may then retrieve the encrypted personal user data from data repository 801, based on the link. For example, client device 101 may transmit to data repository 801, via the link, a request for the encrypted personal user data and receive the encrypted personal user data from data repository 801. Once client device 101 has obtained the encrypted personal user data, client device 101 may use the data access key to decrypt the encrypted personal user data. Once the personal user data is decrypted, client device 101 may access and use the personal user data as described above.

In some example embodiments, data repository 801 may store the same personal user data as stored on transceiver 105. In some example embodiments, the personal user data is stored in data repository 801 instead of being stored on transceiver 105. In some example embodiments, personal user data may be stored in data repository 801, and only a limited set of user data (such as, for example, basic user data) may be stored on transceiver 105. In some example embodiments, the personal user data stored in data repository 801 may be updated. The updated personal user data may be stored in data repository 801 and transmitted to client device 101 upon request for the personal user data.

The description of embodiments in this disclosure provides non-limiting representative examples referencing figures and numerals to particularly describe features and teachings of different aspects of the disclosure. The embodiments described should be recognized as capable of implementation separately, or in combination, with other embodiments from the description of the embodiments. A person of ordinary skill in the art reviewing the description of embodiments should be able to learn and understand the different described aspects of the disclosure. The description of embodiments should facilitate understanding of the disclosure to such an extent that other implementations, not specifically covered but within the knowledge of a person of skill in the art having read the description of embodiments, would be understood to be consistent with an application of the disclosure Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A data access control system, comprising:
  a database storing information comprising a user identifier and a user key associated with a user, and a service provider identifier and a service provider key associated with a service provider;
  a server configured for data communication with a client device associated with the service provider via a network;
  a contactless card associated with the user, the contactless card comprising a communications interface, a processor, and a memory, the memory storing an applet, a user token, and personal user data associated with the user, wherein the personal user data is encrypted using the user key;
  a client application comprising instructions for execution on the client device, the client application configured to:
    in response to a tap action between the contactless card and the client device: receive the user token from the contactless card, and transmit to the server a service provider token, the user token, and a request for a data access key, wherein the service provider token is associated with the service provider;
    receive from the server the data access key;
    receive from the contactless card the encrypted personal user data; and
    using the data access key, decrypt the encrypted personal user data;
  and,
  a processor in data communication with the server and the database, the processor configured to:
    receive from the client device the service provider token, the user token, and the request for the data access key;
    identify the service provider based on the service provider token;
    identify the user based on the user token;
    verify that the service provider is authorized to receive access to the personal user data;
    retrieving, by the processor, the user key from the database;
    generate the data access key from the user key; and
    transmit to the client device the data access key.

2. The data access control system of claim 1, wherein the user token comprises the user key, and the processor is further configured to authenticate the user based on the user key.

3. The data access control system of claim 1, wherein the service provider token comprises the service provider key, and the processor is further configured to authenticate the service provider based on the service provider key.

4. The data access control system of claim 1, wherein:
  the service provider token comprises the service provider key; and
  the data access key is generated from the user key and the service provider key.

5. The data access control system of claim 1, wherein the client application is further configured to display the decrypted personal user data on the client device.

6. The data access control system of claim 5, wherein the client application is further configured to:
  store the data access key on the client device; and only display the decrypted personal user data on the client device if the data access key remains stored on the client device.

7. The data access control system of claim 1, wherein:
the memory of the contactless card further stores basic user data associated with the user, the basic user data encrypted with a basic service provider key; and
the client application is further configured to:
receive from the contactless card the encrypted basic user data; and
using the basic service provider key, decrypt the encrypted basic user data.

8. The data access control system of claim 7, wherein the client application is further configured to:
receive from the server the basic service provider key; and
store the basic service provider key in a memory of the client device.

9. The data access control system of claim 8, wherein:
the client application is further configured to transmit to the server a request for the basic service provider key, the request for the basic service provider key being independent of the tap action between the contactless card and the client device; and
the processor is further configured to:
verify that the service provider is authorized to receive the basic service provider key; and
transmit to the client device the basic service provider key.

10. The data access control system of claim 9, wherein the basic service provider key is valid only for a predetermined period of time.

11. A method for controlling data access, comprising:
establishing a database storing information comprising a user identifier and a user key associated with a user, and a service provider identifier and a first service provider key associated with a service provider;
receiving from a first client device associated with the service provider, via a network, a service provider token and a request for a data access key to access personal user data stored on a contactless card associated with the user, the personal user data encrypted using the user key, the request generated in response to a tap action between the contactless card and the first client device, the request accompanied by a user token stored on the contactless card;
identifying the service provider based on the service provider token;
identifying the user based on the user token;
verifying that the service provider is authorized to receive access to personal user data stored on the contactless card;
retrieving the user key from the database;
generating the data access key based on the user key; and
transmitting to the first client device the data access key.

12. The method of claim 11, wherein the user token includes the user key, the method further comprising authenticating the user based on the user key.

13. The method of claim 11, wherein the service provider token comprises the first service provider key, the method further comprising authenticating the service provider based on the first service provider key.

14. The method of claim 13, wherein the data access key is generated based on the user key and the first service provider key.

15. The method of claim 13, further comprising receiving from a second client device a second service provider key, wherein the data access key is generated based on the user key, the first service provider key and the second service provider key.

16. The method of claim 15, wherein the second service provider key is transmitted by the second client device in response to a tap action between the contactless card and the second client device.

17. The method of claim 11, wherein the database further stores updated personal user data associated with the user, the method further comprising:
encrypting the updated personal user data using the user key; and
transmitting to the first client device the encrypted updated personal user data.

18. A method for controlling data access, comprising:
establishing a database storing information comprising a user identifier and a user key associated with a user, and a service provider identifier and a service provider key associated with a service provider;
providing a contactless card comprising a communications interface, a processor, and a memory, the memory storing an applet and a user token, wherein the communications interface is configured to support at least one of near field communication, Bluetooth, or Wi-Fi, and wherein the contactless card is associated with the user;
providing a client application comprising instructions for execution on a client device associated with the service provider, the client application configured to:
in response to a tap action between the contactless card and the client device: receive the user token from the contactless card, and transmit via a network, to a server, a service provider token, the user token, and a request for a data access key, wherein the service provider token is associated with the service provider;
receive from the server the data access key and a link to a data repository storing encrypted personal user data associated with the user, wherein the data access key is generated based on the user key;
transmit to the data repository, via the link, a request for the encrypted personal user data;
receive from the data repository the encrypted personal user data; and
using the data access key, decrypt the encrypted personal user data;
receiving from the client device, via the network, a service provider token and the request for the data access key to access the personal user data associated with the user, the request accompanied by the user token;
identifying the service provider based on the service provider token;
identifying the user based on the user token;
verifying that the service provider is authorized to receive access to the personal user data associated with the user;
generating the link to the data repository storing the encrypted personal user data;
retrieving the user key from the database;
generating the data access key based on the user key; and
transmitting to the client device the data access key and the link to the data repository storing the encrypted personal user data.

19. The method of claim 18, wherein the data access key is generated based on the user key and the service provider key.

* * * * *